United States Patent

Freitas

[11] Patent Number: 5,586,404
[45] Date of Patent: Dec. 24, 1996

[54] FISHPOLE STORAGE SYSTEM

[76] Inventor: Michael J. Freitas, 1921 Bowers Ave., Santa Clara, Calif. 95051

[21] Appl. No.: 406,678

[22] Filed: Mar. 20, 1995

[51] Int. Cl.⁶ .......................... A01K 97/06; A01K 97/10
[52] U.S. Cl. .................... 43/21.2; 43/25.2; 43/54.1
[58] Field of Search .................. 43/21.2, 25, 25.2, 43/54.1, 57.1; 211/70.8, 89; 206/315.11; D6/552; D3/260

[56] References Cited

U.S. PATENT DOCUMENTS

| | | | |
|---|---|---|---|
| 3,036,398 | 5/1962 | Gagner | 43/25.2 |
| 3,425,150 | 2/1969 | Braese | 43/25.2 |
| 3,484,980 | 12/1969 | Wait | 43/25.2 |
| 3,897,650 | 8/1975 | Pilston | 43/54.1 |
| 3,971,151 | 7/1976 | Banner | 43/24 |
| 3,987,574 | 10/1976 | Pennino | 43/54.1 |
| 4,529,112 | 7/1985 | Miller | 43/21.2 |
| 4,628,628 | 12/1986 | Bergin et al. | 43/26 |
| 4,707,892 | 11/1987 | Nelson | 24/336 |
| 4,961,505 | 10/1990 | Moeller | 211/70.8 |
| 5,152,494 | 10/1992 | Frunzar | 43/21.2 |
| 5,446,990 | 9/1995 | Eriksson | 43/57.1 |

Primary Examiner—J. Elpel
Attorney, Agent, or Firm—Robert Samuel Smith

[57] ABSTRACT

A device for storing and carrying sections of a fish pole including an elongated central member with a substantially rectangular cross section and having a pair of pole catches, one pole catch detachably attachable to one side of the central member opposite the other pole catch detachably attached to the opposite side of the central member and a wall bracket with an extending double prong which detachably engages an aperture in the central member. Therefore the fishing pole can be stored against a wall or withdrawn and carried with the two fish pole sections engaged together. The central member also has a tackle box for carrying a lure/hook.

7 Claims, 1 Drawing Sheet

FISHPOLE STORAGE SYSTEM

FIELD OF THE INVENTION

This invention relates to devices for storing fish poles and lures and particularly to a storage device with which a user can hang his/her fish pole on a wall or conveniently carry his/her fishing gear without separation (loss) of the parts.

BACKGROUND AND INFORMATION DISCLOSURE

The typical fish pole has a length that is inconvenient when it is required to either store the fish pole (when not in use) or transport such as in the trunk of a car. Because of the inconvenient length, fish poles available in the marketplace typically are made in two sections that telescope together, end to end, for use but which are separated for storage or transportation purposes. While this permits storing or transporting the pole in more confined spaces, detaching and storing the lure and storage of the pole sections as well as hand carrying the pole with the lure is an inconvenience.

A number of devices have been disclosed which are intended to address the problem associated with storing fish poles and lures.

For example, U.S. Pat. No. 3,425,150 to Braese discloses two carder clips made of molded rubber having sleeve portions applicable to opposite ends of the handle section of a two section fish pole and additional sleeve portions designed to have the other section of the rod slipped thereinto when detached from the handle section.

U.S. Pat. No. 4,707,892 to Nelson discloses a clamping device for securing the sections of the pole together when the pole has been disassembled.

U.S. Pat. No. 4,628,628 to Bergin et al discloses a fishing equipment holder composed of an elongated cylindrical body dimensioned to store fishing tackle. Circular brackets encompassing the cylinder have notches for detachably attaching sections of a fish pole.

U.S. Pat. No. 3,971,151 to Banner discloses a fish hook holding device attachable to a fish pole.

U.S. Pat. No. 3,484,980 to Wait discloses a container for lures that clips onto a fishing pole.

None of the devices disclosed offer the combined advantages of compact storage, convenience of carrying, safety from being hooked by a lure attached to the end of the line and ease of assembly and disassembly.

OBJECTS

The present invention offers a combination of advantages over the devices of the prior art in achieving the following objects.

It is an object of this invention to provide a device that facilitates storage and/or transportation in a vehicle of a fish pole having two sections and facilitates storage of a lure with the fish pole without the necessity of detaching the lure from the end of the line.

It is another object to be able to conveniently hang the fish pole with lure on a wall where it is out of the way yet quickly accessible to the user.

It is another object that the user be able to pick up his/her rod and manually carry it from its place of storage or vehicle to another location such as a fishing spot.

It is another object that the fisherman be able to carry his pole with the lure attached but secured to the pole in such a way that the fisherman is in no danger of being hooked by the lure.

SUMMARY

This invention is directed toward a fish pole holder that clips two pole sections together for convenient carrying and which plugs into a wall bracket for convenient storage. A "lure size" tackle box on one side of the holder provides convenient safe storage for a lure without requiting that it be detached from the end of the fish line. The holder includes an elongated central member having a generally rectangular cross section (i.e.,four sides). A pair of pole catches are detachably attached by tongue and groove construction on opposite sides of the central member. The tackle box is attached to a third side of the central member. The fourth side has means for temporarily engaging a wall bracket when it is required to store the fish pole with lure/hook.

DESCRIPTION OF A PREFERRED EMBODIMENT

Figure 1:
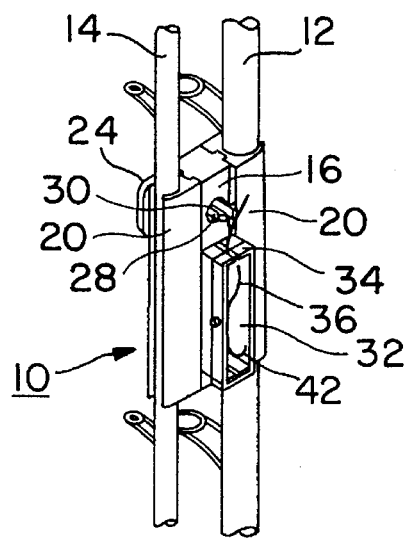
FIG. 1 shows an assembly view of the invention.
Figure 2:
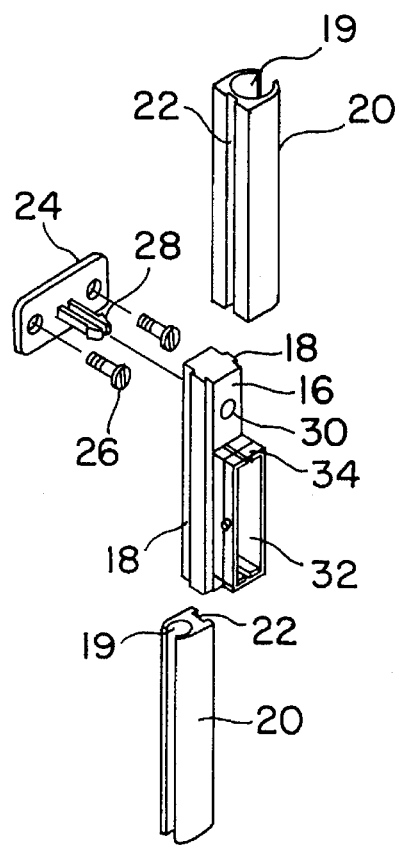
FIG. 2 shows an exploded view of the invention.

Turning now to a discussion of the drawings, FIG. 1 is an assembly view of the invention 10 shown holding two disassembled sections 12 and 14 of a fish pole. FIG. 2 is an exploded view of the invention 10. There is shown a central member 16 having four sides with a tongue 18 on two opposite sides. Two pole catches 20 are shown, each catch 20 with a groove 22 positioned for slidably engaging the tongues 18 of the central member 16.

Each catch 20 is preferably made of an elastomer such as rubber or plastic and has a cylindrical slot 19 dimensioned for snapping onto a section 12 or 14 of the fish pole. A wall mount 24 is shown which bolts against a vertical wall such as by screws 26.

A double element prong 28 extends away from the wall bracket 24 which is positioned to engage an aperture 30 in the central member 16 thereby permitting storage of the fishing gear by hanging it against a wall when required. A tackle box 32 is secured to a side of the central member 16. A slot 34 in the tackle box 32 is positioned to receive the string 36 from the pole (not shown in FIG. 2) attached to the lure/hook 42.

The following steps are taken when it is desired to store the fish pole:

the wall mount 24 is secured to the wall;

the fish pole is separated into its two sections 12 and 14 and laid side by side next to one another;

each pole catch 20 is snapped onto one of the pole sections 12, 14 respectively;

the groove 22 of each pole catch 20 is slid onto a tongue 18 of the central body 16 respectively;

the lure/hook 42 is placed in the tackle box 32 with the string in the slot 34.

the double element prong 28 of the wall mount 24 is positioned through the aperture 30 and thereby engages the central member 16.

When it is desired to use the pole for fishing, the double element prong 28 is squeezed together and the central member 16 with pole sections attached by pole catches 20 is withdrawn from the wall mount 24;

the lure/hook 42 is withdrawn from the tackle box 32;

the two pole sections 12 and 14 are separated from the central member 16 by disengaging the tongues 18 in the central member 16 from the respective groove 22 of the pole catch 20;

the pole sections 12 and 14 are joined.

Other variations and modifications may be suggested after reading the specification and studying the drawings which are within the scope of the invention.

For example, a hook may formed on the central member and a loop formed on the wall mount so that the central member may be detachably engaged to the wall mount by engaging the hook on the loop.

The tongue may be formed on the pole catches and the loop formed on the central member.

One of the tongue and groove combinations may be eliminated so that the central member is permanently attached to one of the pole sections.

The tackle box may be detachably attached to the central body.

Figure 3:
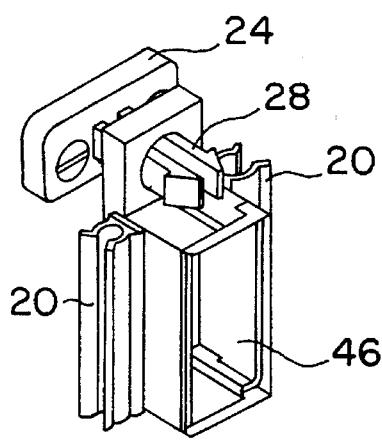
FIG. 3 shows the central member being a tackle box.

As shown in FIG. 3, the central member may be a tackle box 46.

Figure 4:
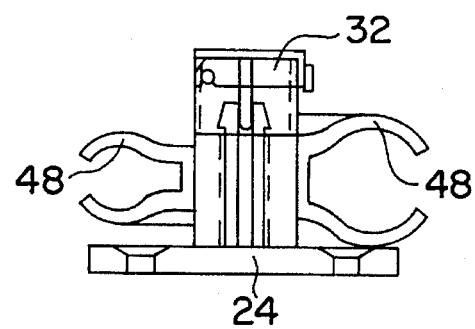
FIG. 4 shows the fish pole sections attached by metal clips.

As shown in FIG. 4, the means for detachably attaching the pole sections to the central body could be a pair of spring metal clips 48.

In view of these various embodiments, I wish to define the scope of my invention by the appended claims and in view of the specification if need be.

I claim:

1. A device for storing and carrying a fish pole wherein said fish pole has two sections that are detachably joinable end to end, said device comprising:

an elongated central member having a substantially rectangular cross section;

a pair of elongated tongues, one of said tongues on one side of said central member opposite another side of said central member having the other of said tongues;

a pair of pole catches, each pole catch being elongated with an elongated groove on one side dimensioned to mate with one of said tongues and an elongated groove on another side adapted to detachably engage a fish pole section; and means for detachably attaching said central member to a wall.

2. The device of claim 1 wherein said central member comprises a tackle box.

3. The device of claim 1 wherein said pole catches are composed of an elastomer.

4. The device of claim 1 wherein said central member has an aperture and said means for detachably attaching said central member to a wall comprises:

a bracket plate having means for fastening said bracket plate to a wall;

a double element prong having one end secured to said bracket plate and extending away from said bracket plate;

said double element prong and said aperture in said central member operably arranged to permit plugging said double element prong into said aperture when each said section of said fish pole is detachably engaged with said central member.

5. The device of claim 4 which comprises a tackle box secured to said central member and adapted such that, when said sections of said fish pole are detachably secured to said respective pole catches, a lure and hook is storable in said tackle box.

6. The device of claim 5 wherein said tackle box has a slot operably located and adapted such that an end of a fishing line mounted on one of said sections of said fish pole and having an end attached to said lure and hook in said tackle box is positionable in said slot.

7. The device of claim 1 wherein said pole catches adapted to detachably engage said sections of a fish pole are metal clips.

* * * * *